United States Patent [19]

Horvath et al.

[11] Patent Number: 4,942,998
[45] Date of Patent: Jul. 24, 1990

[54] APPARATUS AND PROCESS FOR AUTOMATICALLY DISPENSING METAL ALLOY PASTE MATERIAL FOR JOINING METAL COMPONENTS

[76] Inventors: Bruce B. Horvath, 1831 E. 291st St., Wickliffe, Ohio 44092; Raymond A. Hurlbut, 34910 Dixon Rd., Willoughby Hills, Ohio 44094; A. Thomas DiFranco, 6760 Stafford Dr., Mayfield Hts., Ohio 44124; Bruce R. Williams, 13278 Green Dr., Chesterland, Ohio 44026

[21] Appl. No.: 393,078

[22] Filed: Aug. 9, 1989

Related U.S. Application Data

[63] Continuation of Ser. No. 285,284, Dec. 15, 1988, abandoned, which is a continuation of Ser. No. 165,440, Feb. 29, 1988, abandoned, which is a continuation of Ser. No. 54,142, May 12, 1987, abandoned, which is a continuation of Ser. No. 893,485, Aug. 7, 1986, abandoned, which is a continuation of Ser. No. 788,661, Oct. 17, 1985, abandoned, which is a continuation of Ser. No. 532,998, Sep. 19, 1983, abandoned.

[51] Int. Cl.⁵ .................................................. B23K 3/06
[52] U.S. Cl. ..................................... 228/102; 222/262; 222/630; 228/248
[58] Field of Search ............... 228/248, 102, 223, 224; 222/373, 630, 637, 262, 263

[56] References Cited

U.S. PATENT DOCUMENTS

| | | | |
|---|---|---|---|
| 3,081,914 | 3/1963 | Crafts | 222/373 X |
| 3,377,986 | 4/1968 | Everett | 118/317 |
| 3,463,363 | 8/1969 | Zelna | 222/504 X |
| 3,711,020 | 1/1973 | Zelna | 239/4 X |
| 3,960,187 | 6/1976 | Stock et al. | 222/373 X |
| 4,132,341 | 1/1979 | Bratschun | 228/248 |
| 4,487,365 | 12/1984 | Sperber | 222/630 |

Primary Examiner—Kenneth J. Ramsey
Attorney, Agent, or Firm—Watts, Hoffmann, Fisher & Heinke Co.

[57] ABSTRACT

An apparatus and process for dispensing predetermined, incremental units of fusible metal alloy paste material for joining together metal components by means of a pneumatic applicator system.

3 Claims, 5 Drawing Sheets

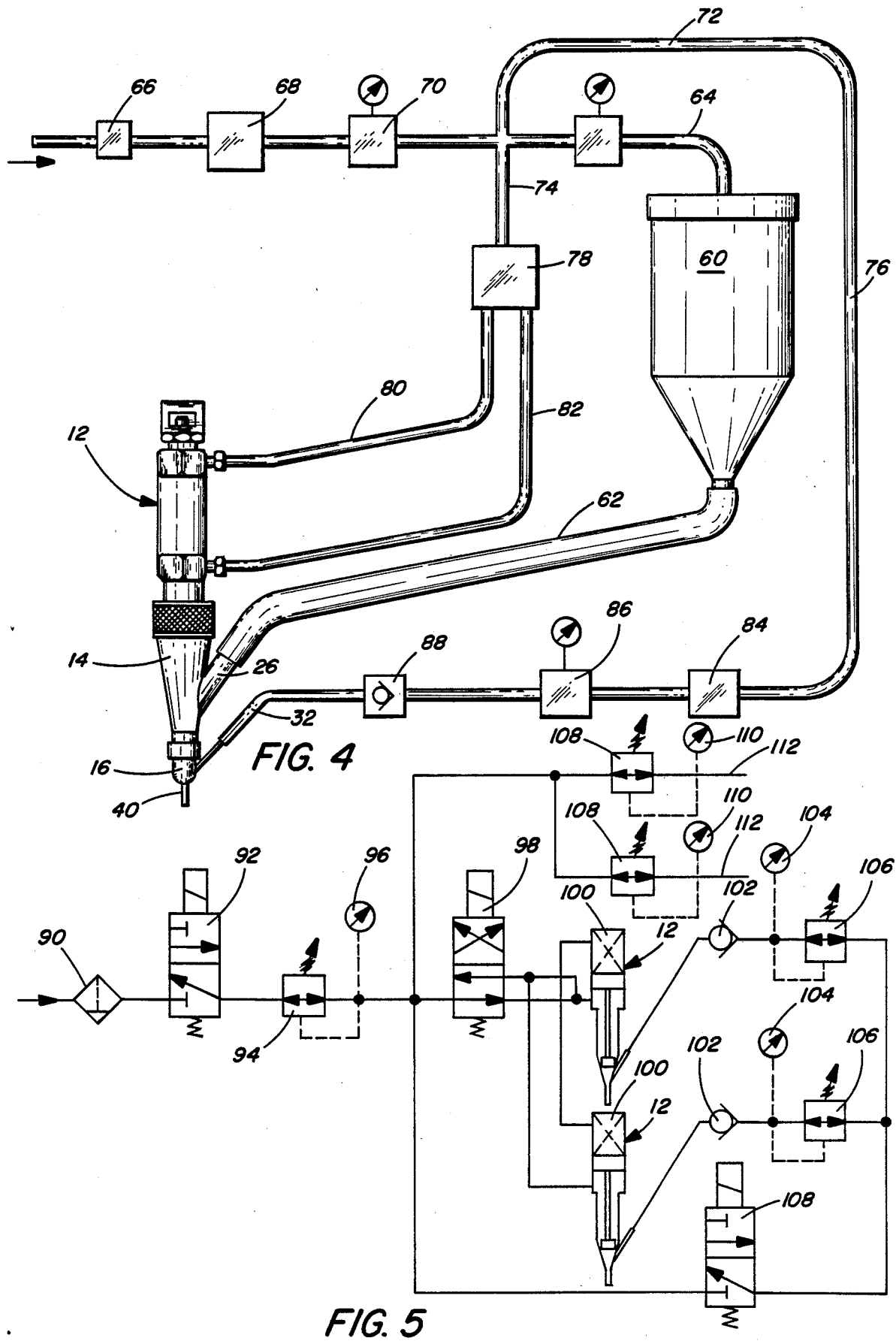

APPARATUS AND PROCESS FOR AUTOMATICALLY DISPENSING METAL ALLOY PASTE MATERIAL FOR JOINING METAL COMPONENTS

RELATED APPLICATIONS

This application is a continuation of Ser. No. 285,284, filed Dec. 15, 1988 and now abandoned; which is a continuation of Ser. No. 165,440, filed Feb. 29, 1988 and now abandoned; which is a continuation of Ser. No. 54,142, filed May 12, 1987 and now abandoned; which is a continuation of Ser. No. 893,485, filed Aug. 7, 1986 and now abandoned; which is a continuation of Ser. No. 788,661, filed on Oct. 17, 1985 and now abandoned; which is a continuation of Ser. No. 532,998, filed Sept. 19, 1983 and now abandoned.

TECHNICAL FIELD

The present invention relates to a new and novel apparatus and process for dispensing predetermined, incremental units of fusible metal alloy paste materials, such as brazing and solder paste compositions, for brazing and soldering together metal components, such as in the joining of a carrying handle, for example, to a container or the like.

RELATED PATENTS

The present invention relates generally to the utilization of pressure-type applicators for the delivery of fluent solid or paste-type materials, such as brazing and solder pastes, and more particularly to the type of applicator gun of the type disclosed, for example, in Applicant's prior U.S. Pat. Nos. 3,463,363 and 3,711,020.

The present invention involves that which is believed to be a significant step forward in the utilization of such type of pressure applicator in an automated system and which enables one component part, such as a carrying handle, to be efficiently joined to a second component part, such as a container or receptacle, and at a relatively high rate of application.

BACKGROUND ART

Heretofore, there have been various types of dispensing systems for delivering metered amounts of water, solvents, epoxies, lubricants including grease, paints and other materials. Such prior dispensing systems have included hydraulic or pneumatic metering and mixing mechanisms for dispensing volumetric drops, globules or shots of material onto a workpiece. Such prior mechanisms are not effective for use in an automated process or system for precisely depositing a predetermined, discrete incremental brazing and soldering paste unit for joining metal pieces at a relatively high rate of speed. Specifically, such prior mechanisms have simply not been effective in providing such brazing and soldering paste materials at extremely high speeds (i.e. up to 4 paste dot increments per second) for joining a carrying handle to a tin container, for example.. Typical of such prior mechanisms for metering and/or dispensing various types of fluent materials are disclosed, for example, in U.S. Pat. Nos. 1,990,823; 2,516,908; 3,677,447; 3,212,131; and 3,377,986.

DISCLOSURE OF THE INVENTION

The present invention contemplates the provision of an apparatus and process for the continuous joining of a first metal component to a second metal component by metering and dispensing a fusible alloy paste composition at high speeds up to four (4) paste deposits (i.e. incremental dot units) per second. For example, the application of soldering a carrying handle to a container and utilizing a pair of applicator guns, this process would result in the joining of up to 210 handles to cans per minute. The process includes the steps of continuously moving the first metal component (i.e. container) relative to a paste applicator station which may include one or more applicator guns disposed in a predetermined angular and spatial relationship relative to a continuously moving conveyor which transports the first metal component. The movement of the first metal component, on the continuously moving conveyor, is automatically controlled in a predetermined, timed sequence relative to the applicator guns which deliver, by positive displacement, a predetermined, incremental paste unit into a specially designed discharge nozzle. Then in this predetermined timed sequence, a pneumatic jet-like pulse is delivered into the discharge nozzle in a manner to simultaneously shear and axially discharge a metered paste increment through an elongated discharge tube onto a very small predetermined surface area of the first metal component, and then moving a second metal component (i.e. handle) into engagement with the first metal component with the paste increment being disposed therebetween to provide a soldered joint. The paste joint is then heated to the fusing temperature, whereupon, the components are thereafter cooled to provide a finished metallurgical bond.

Accordingly, it is a primary object of the present invention to provide an automated apparatus and process for metering and dispensing predetermined incremental units of such paste materials in accurate amounts, and to accomplish such metering and dispensing at relatively high speed rates onto a small target area.

Another object of the present invention is to provide a new and improved construction for the discharge nozzle for such type of pressure applicator gun and that can effectively discharge various amounts of paste with accuracy and at a predetermined distance from the joint (joint distance) without clogging after repeated useage.

A further object of the present invention is to provide a novel fusible solder paste composition that can be effectively employed in the process in the present invention, and that has adequate flow and sufficient stability and adherence to remain in place on the work surface (i.e. slump) until the fusing heat is applied, and that leaves, if any, a non-corrosive and solid flux residue which can be removed with organic solvents.

These and other objects, uses and advantages of the present invention will become apparent to those skilled in the art from the following drawings, description and claims.

BRIEF DESCRIPTION OF THE DRAWINGS

FIG. 4 is a general schematic diagram illustrating one form of the hydraulic and fluid flow system of the present invention; and FIGS. 5 and 6 are diagrammatic illustrations of one form of the control system of the present invention.

BEST MODE FOR CARRYING OUT THE INVENTION

Figure 1:
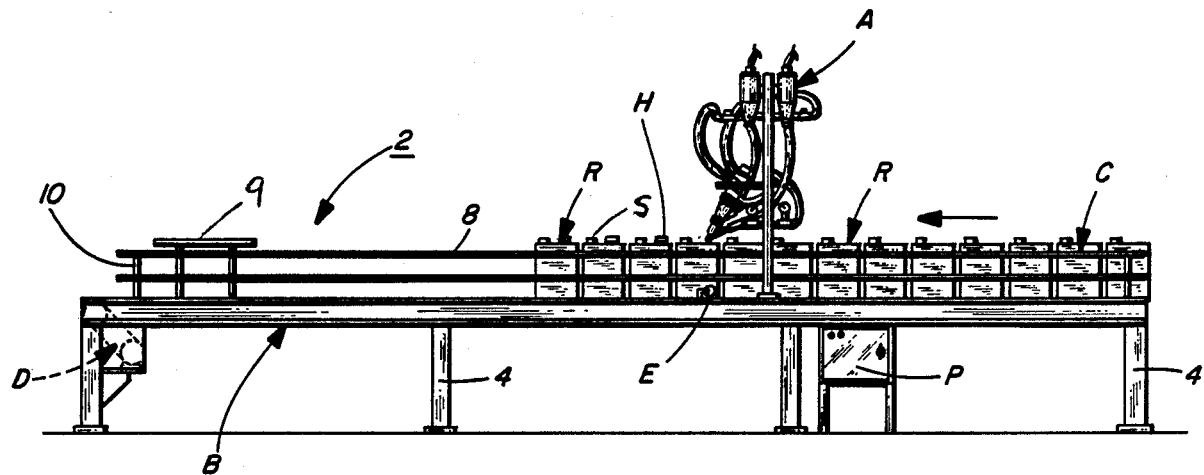
FIG. 1 is a side elevation view illustrating the automated apparatus and system of the present invention for joining (as by soldering) a component part (handle) to a container or receptacle.
Figure 2:
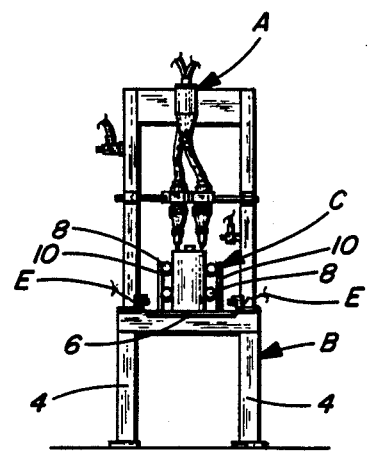
FIG. 2 is an end elevation view looking from the right-hand side of FIG. 1.
Figure 2A:
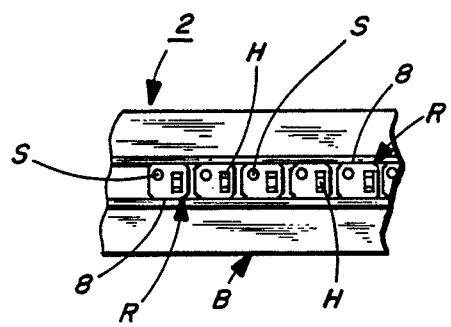
FIG. 2A is a fragmentary top plan view of a portion of the conveyer system illustrated in FIG. 1.
Figure 3A:
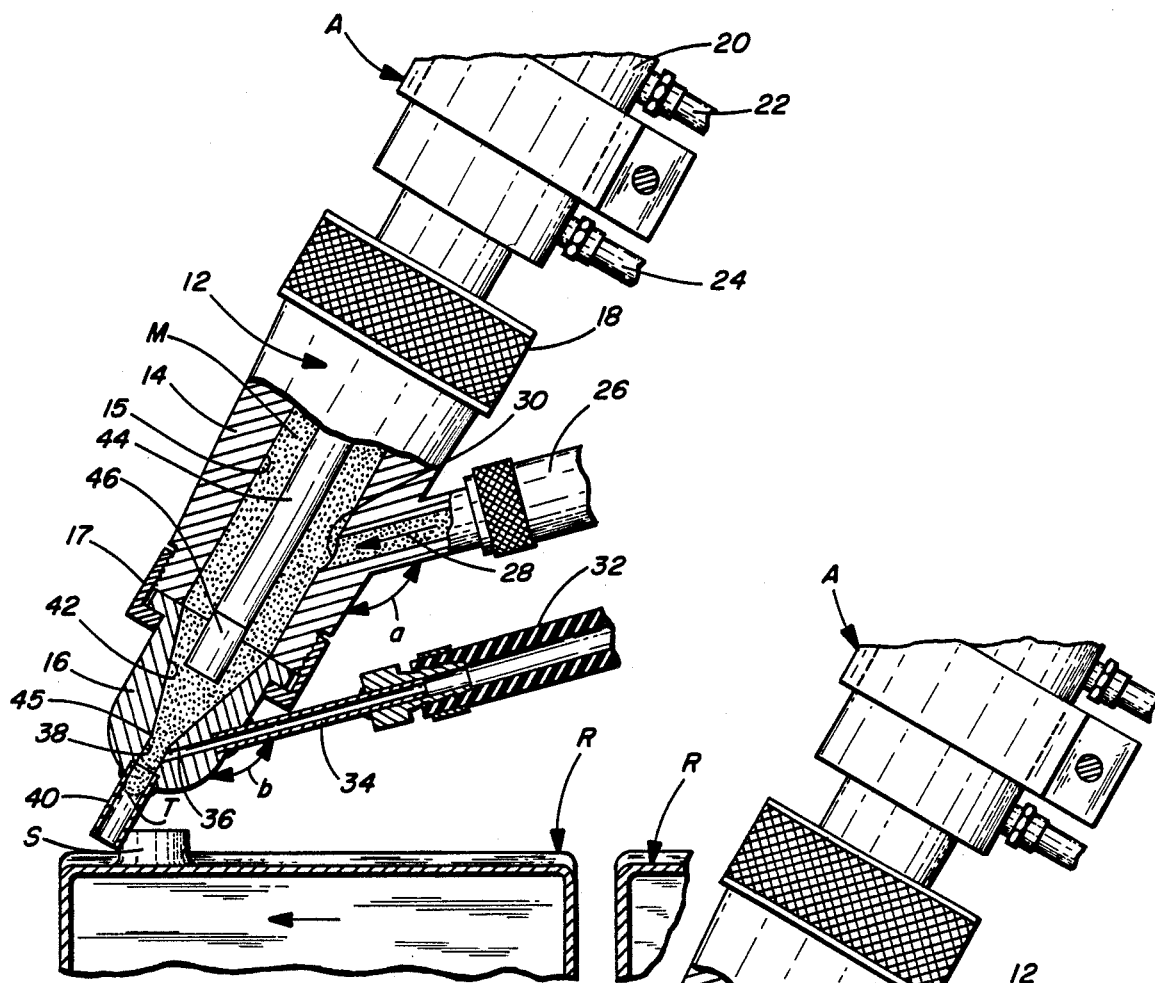
FIG. 3A is a fragmentary, side elevation view, partly in section, illustrating a first sequential step in accordance with the method of the present invention.

Referring again to the drawings and in particular to FIGS. 1, 2 and 3A thereof, there is illustrated one preferred application of the automated apparatus and system of the present invention for automatically and continuously joining, such as by paste soldering, a component part, such as a handle H, to a container or receptacle R, such as a paint can or the like, leaving a spout S transported on an automated conveyor, as at C, system. In the embodiment illustrated, a predetermined, incremental deposit of a solder paste material I (FIG. 3C) is automatically applicated via an applicator station, as at A, which station is disposed transverse to the linear path of movement of the automated conveyor system.

As illustrated, the conveyor system C includes a base frame structure B including a plurality of support legs 4 which together mount a conveyor belt 6 for transporting thereon a plurality of the containers and/or receptacles, as at R, which are guided by a series of guide rails, as at 8 (FIG. 2), that are interconnected by cross-brace members 10. A heat manifold, as at 9, is provided to heat the deposited paste to the desired solder temperature.

In the invention, the applicator station A may include a pair of laterally spaced applicator guns, as at 12 (FIG. 3A) for simultaneously applying predetermined, incremental paste deposits I to the container R for securement of the handles H thereto. The conveyor belt 6 is driven by a conventional pulley and motor drive, as at D, in a manner as known in the art. Also, the automated system of the invention is automatically controlled by an operator having access to a control panel, as at P. Accordingly, as will be more fully discussed hereinafter, the solder paste composition, in this embodiment, is automatically applied to the containers R, by the applicator guns 12 which are automatically controlled by an electric eye device, as at E, located on the conveyor frame structure B.

As indicated, the applicator station A includes one or more applicator guns 12 which may incorporate the basic structural features as embodied, for example, in applicant's prior U.S. Pat. Nos. 3,463,363 and 3,711,020. As recognized, such applicator gun is of the pressure-type for the disposition of fluent solid or paste-type materials, such as solders and brazing pastes. Such applicator gun is to be distinguished, therefore, from the syringe-type device for dispensing mono-dispersed aerosol droplets of the type, for example, illustrated in U.S. Pat. No. 3,677,447.

In the present invention, the applicator gun 12 has a fluid body member 14 and a detachable dispensing nozzle 16 with a conventional spring-loaded fluid motor (not shown) of the type illustrated in applicant's U.S. Pat. No. 3,711,020. Such fluid motor may be operated by a hydraulic fluid or a gas under pressure and preferably includes a reciprocating piston, pneumatic motor having a cylinder or fluid body, as at 20, and a reciprocating piston rod 44 extending from the cylinder and coaxial therewith. Such piston rod is fixedly connected to a removable cylindrical valve tip element 46 that moves into and out of engagement with the nozzle 16. The piston rod 44 acts as a plunger with the tip element 46 being made from a natural or synthetic polymeric material of the types disclosed in applicant's U.S. Pat. No. 3,711,020. For example, it has been found that a rubber material, such as Buna-N-rubber provides satisfactory results. The air pressure delivered to the ports 22 and 24 of the cylinder 20 may vary depending on the type of paste composition being utilized. Such pressure is preferably in the range between 40 to 50 pounds per square inch. A double-acting piston may be utilized in conjunction with a diaphragm (not shown) for applying pressure to the piston rod 44, as disclosed in applicant's U.S. Pat. No. 3,463,363.

In the invention, the fluid body member 14 (FIG. 3A) includes an interior cylindrical bore 15 having a uniform diameter that merges outwardly into a frustro-conical cavity 42 disposed in the dispensing nozzle 16. The nozzle 16 may be detachable connected to the fluid body member 14 by a nozzle nut 17, as known in the art.

Figure 3B:
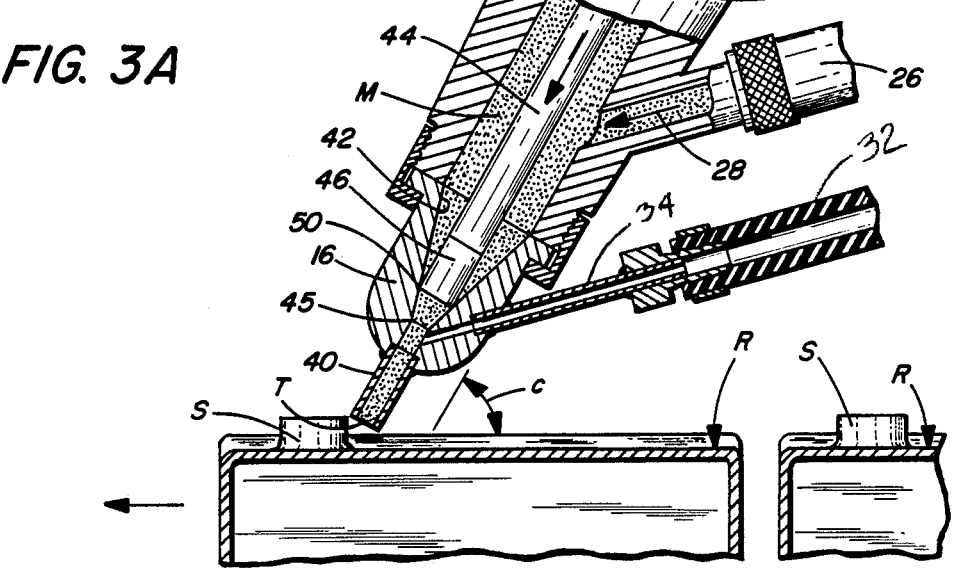
FIG. 3B is a fragmentary, side elevation view, partly in section, illustrating a second sequential step in accordance with the method of the present invention.

As best illustrated in FIG. 3A, the nozzle 16 has concentric, axial passageway, as at 38, that merges, as at the juncture 45, into the frustro-conical cavity 42. The axial passageway 38 has a uniform reduced diameter that is less than that of the tip element 46. The tip element 46 is adapted to seat in generally line-contact, as at 50, onto the confronting interior surface of the frustro-conical cavity 42 in the closed or seated position of the piston rod 44, as best illustrated in FIG. 3B. Preferably, the diameter of the tip element 46 is ⅛ to 5/16 inches and the diameter of the axial passageway 38 is 5/64 to 9/64 inches. Preferably, the frustro-conical bore 42 has an included angle of 15 to 45 degrees with the axial length up to the merger point 45 being approximately 5/8 inches.

In the invention, an elongated linear discharge tube 40 is attached to and extends axially outwardly from the nozzle 16 and is disposed in concentric relationship with respect to the axial passageway 38. Preferably, the interior diameter of the tube 40 is approximately 0.106 inches and has a length of approximately ½ inch. Accordingly, the interior diameter of the tube 40 may equal that of the interior diameter of the axial passageway 38 so as to provide an uninterrupted flow-path for delivering paste material, as at M, therethrough. It will be understood that the tube may be made unitary with the nozzle, as desired.

A pneumatic inlet hose fitting 32 is detachably connected to an inlet tube 34 that communicates with an inclined passageway 36 (FIG. 3A) formed in the nozzle 16. The inlet tube 34 and passageway 36 may have an interior diameter of approximately 0.0635 inches so as to introduce air under pressure into the axial passageway 38. The air pressure is in the range from approximately 15 to 30 psi with the preferred pressure being approximately 20 to 25 psi. The passageway 36 communicates with the passageway 38 at the juncture or apex end, as at 45, of the nozzle cavity 42 and axially the discharge tube 40. In the Invention, the inlet tube 34 and passageway 36 are disposed at an acute (b) angle of between approximately 30° to 60°. By this arrangement, an effective angular jet-like air pulse is introduced into the axial passageway 38. This has the effect of shearing the paste material M, as at 52 (FIG. 3C), for a spit-fire like discharge action out through the discharge tube 40.

A paste material delivery inlet tube 26 is disposed axially above and in parallel relationship to the inlet tube 34. This tube 26 is disposed for delivering paste material under a pressure of 5 psi to 30 psi, with 10 psi to 15 psi being preferred, in the direction of the arrow, as illustrated at 28 in FIG. 3A. Accordingly, the angle of inclination (a) of the paste tube 26 is preferably the same as the angular inclination (b) of the inlet tube 34.

In the invention, the applicator gun 12 is disposed at an inclined angle relative to the general horizontal plane of the conveyor C. Preferably, the angle of inclination, is less than 90° dependant on the application. This inclination is provided in order to facilitate the deposit of the predetermined incremental paste deposits in laterally spaced parallel relationship on the confronting top surface of the receptacle R for securement, thereafter, of the handle H thereto.

Figure 3C:
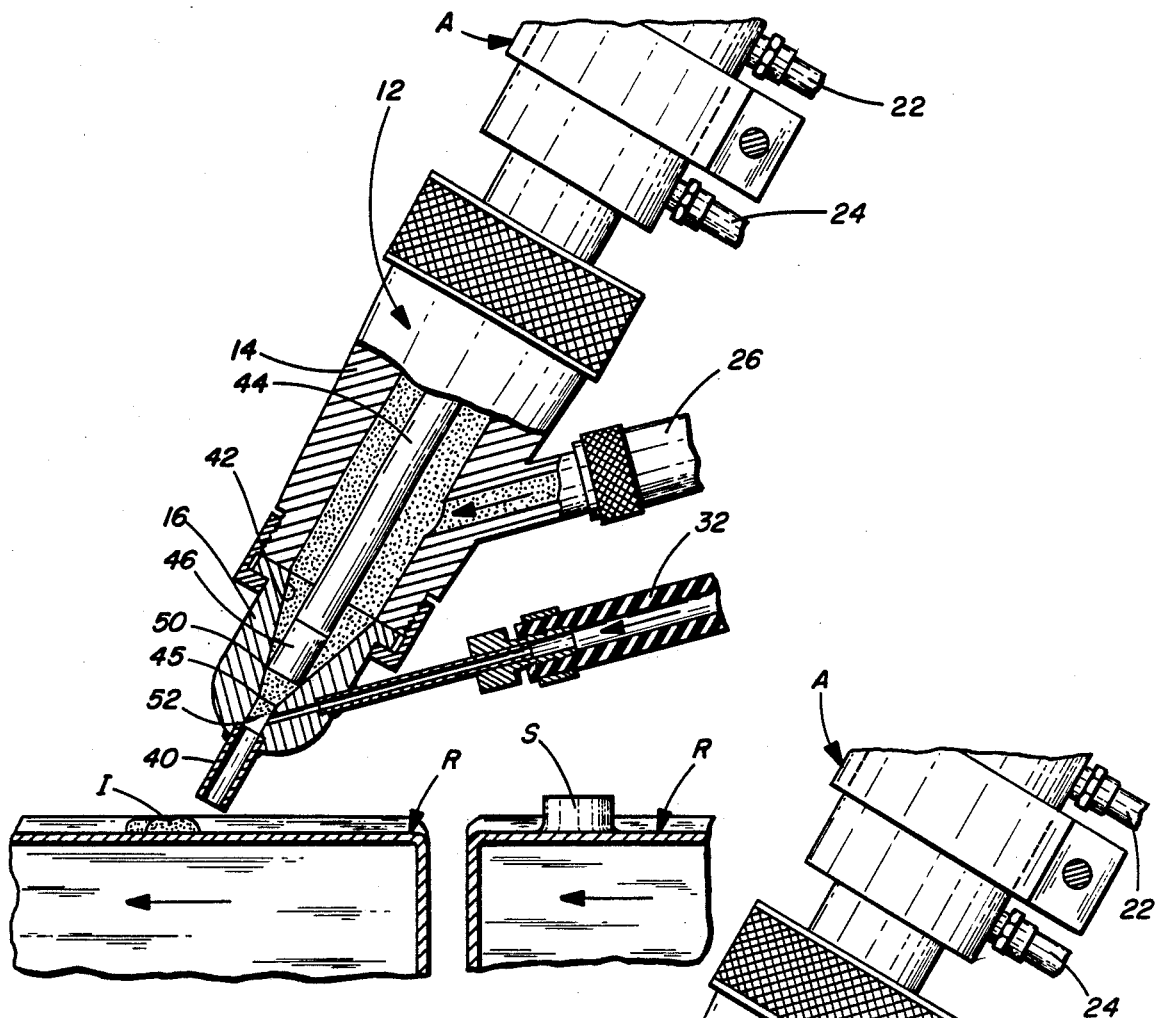
FIG. 3C is a fragmentary, side elevation view, partly in section, illustrating a third sequential step in accordance with the method of the present invention.
Figure 3D:
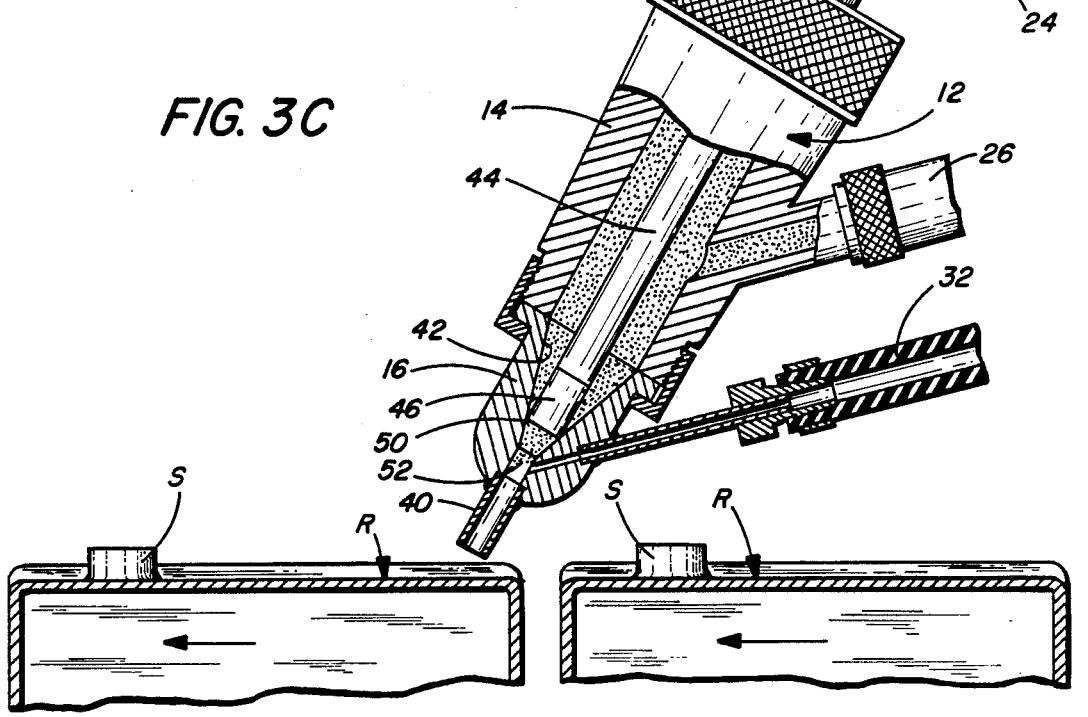
FIG. 3D is a fragmentary, side elevation view partly in section, illustrating a fourth sequential step in accordance with the method of the of the present invention.

Referring to FIGS. 3A, 3D and FIG. 4, there is sequentially illustrated the front end portion of one of the typical applicator guns 12 for automatically applying the paste increment I to the receptacle R. In FIG. 3A, the inlet port 24 of the cylinder 20 is pressurized such that the piston rod 44 and tip element 46 are in the raised position, as illustrated. At this time, there is a constant pressure on the paste inlet tube 26 and a zero pressure in the pneumatic injection tube 32. In FIG. 3B, the top inlet port 22 is pressurized so as to move the piston rod 44 and tip element 46 downwardly in a direction of the arrow into the closed position so as to provide a line-contact, as at 50, with the interior of the frustro-conical cavity 42 of the nozzle 16. At this time, a constant pressure is maintained on the paste injection inlet tube 26 and the pneumatic inlet tube 32 is maintained at the zero pressure. In FIG. 3C, the top inlet port 22 of the cylinder 20 is maintained pressurized with a constant pressure being maintained on the paste inlet tube 26. At this time, the pneumatic inlet tube 32 provides jet-like air-pulse which acts to shear-off the volume of paste material, as at 52, held in the cavity 42 below the tip element 16. This incremented paste I is propelled axially downwardly through the discharge tube 40 and onto the confronting surface of the receptacle R. The paste increment is effectively deposited from a predetermined distance to the joint (paste joint). It has been found that effective deposits can be made to distances greater that the paste deposit diameter (i.e. ⅛ inch) and up to 1 inch with a discharge tube 40 length of ½ inch.

As illustrated in FIG. 3D, the top port 22 of the cylinder 20 is maintained pressurized along with a constant pressure being maintained on the paste inlet tube 26 but then the pneumatic pressure on the inlet tube 32 is stopped so as to repeat the cycle commencing with once again pressurizing the lower inlet port 24, as illustrated in FIG. 3A. During this operational cycle, the entire volume of the bore 15 remains full of paste material M, as does the paste inlet tube 26.

In FIG. 4, there is schematically illustrated one form of an pneumatic control system for the paste material supply which is delivered from a tank 60 via tube 62 to the inlet paste tube 26. Pneumatic pressure (i.e. air) is delivered into the system and controlled by a solenoid 68 and control regulators 70–73 for pressurizing the tank 60 via inlet tube 64. Another solenoid 78 controls air pressure delivered from the tube 74 to the tube 80 for delivery to the upper inlet port 22 of the cylinder 20. Solenoid 78 controls delivery of air pressure via tube 82 to the lower inlet port 24. Air pressure delivered from tube 76 is controlled by solenoid 84, control regulator 86 and a check valve 88 for providing timed air-pulses to the pneumatic inlet tube 32.

Figure 6:
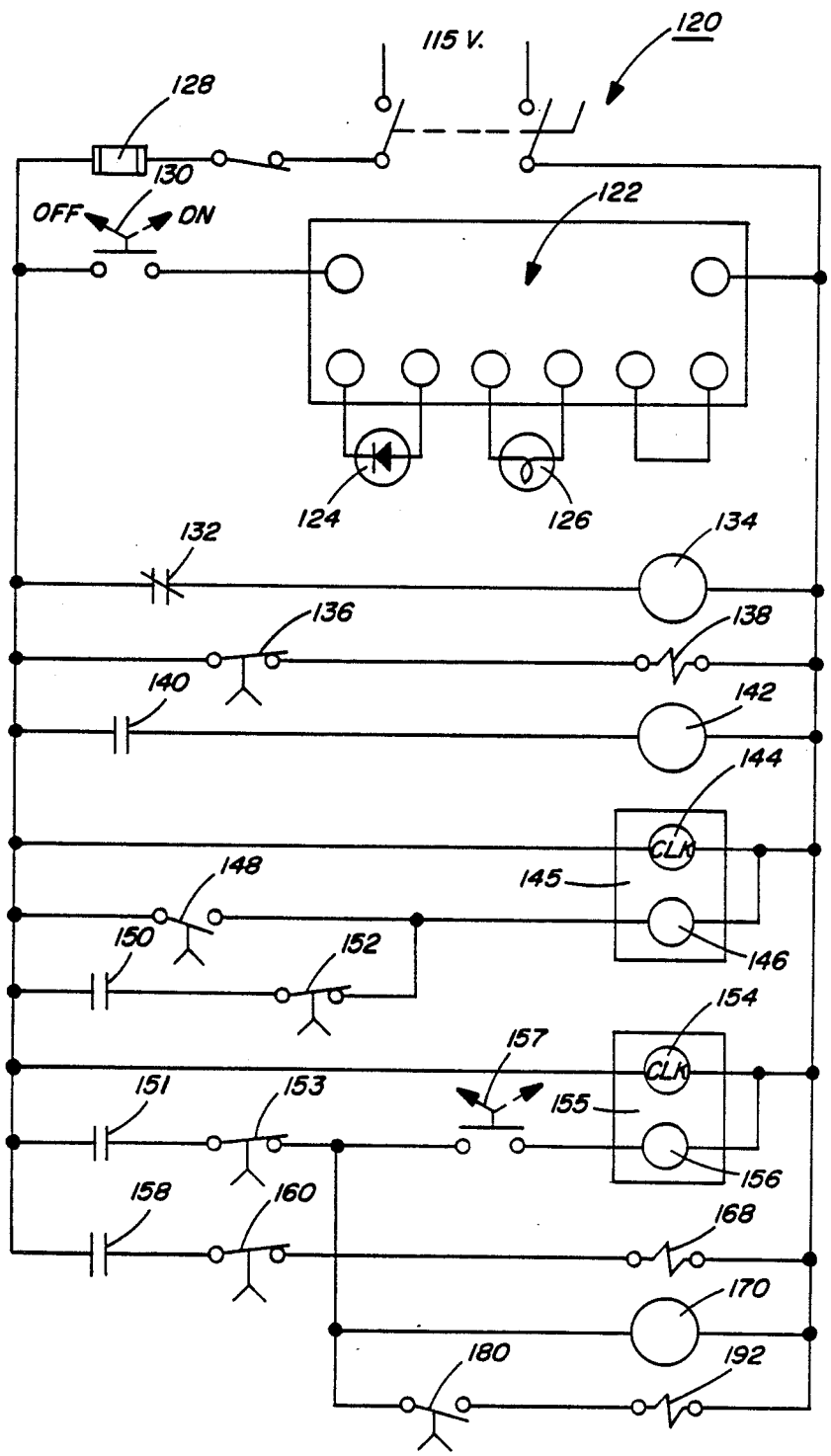

In a typical operation, the power for the electrical circuit (FIG. 6) may be provided from 115 volt current that commences with activation of a main switch 120 that energizes a purge timer 134 and a tank pressure solenoid 136, 138. Selector switches 128 and 157 are then actuated and the leading edge of the receptacle R acts to interrupt the photoelectric beam of the electric eye device E that, in turn, energizes a piston rod 44 retract delay timer 140, 142. After a pre-set delay, a cycle and pulse duration timer 144, 145, 146 is energized. This variable delay is provided to properly position the paste increments on a receptacle R while being able to adjust for varying conveyor belt speeds. Energizing the cycle and pulse duration timer also energizes the piston rod retract duration timer 154, 155, 156 together with the piston rod solenoid 168 and the airpulse delay timer 180. This automatically retracts the piston rod 44 allowing the paste material to fill the frustro-conical cavity 42 and axial passage 38 of the nozzle 16, as illustrated in FIG. 3A. After the piston rod timer 154, 155, 156 has timed-out, the piston rod solenoid 168 is again energized for extending the piston rod 44 axially downwardly for forcing the paste material downwardly to fill the discharge tube 40, as illustrated in FIG. 3B. The air-pulse delay timer 144, 145, 146 and that has also now been energized, then times-out so as to energize the airpulse solenoid 182 for delivering air under pressure to the inlet tube 32 for shearing and discharging paste from the nozzle discharge tube 40, as aforesaid. After the cycle timer times out, it deenergizes the air-pulse solenoid 182 that terminates the air-pulse so as to complete the pasting cycle. After the receptacle R leaves the photoelectric beam produced by the electric eye device E, all of the system timers are re-set so that the system is automatically ready to repeat the cycle upon arrival of the next receptacle. This again energizes the photoelectric control 122 of the electric eye device E which includes a conventional receiver 124 and light source 126.

As will be seen, the applicator station A, in the embodiment illustrated, includes a pair of applicator guns 12 disposed in laterally disposed relation so that two paste deposits (incremental dots) can be simultaneously deposited in such spaced relation on the confronting surface of the receptacle R. This then enables the conventional type U-shaped handle H to be automatically or manually placed on the receptacle and over the paste deposits so that the paste material can be raised to the solder temperature at the heat manifold station 9 for soldering the parts together. Disposing the applicator guns at a predetermined acute angle in respect to the general horizontal plane of the conveyor belt enables a predetermined paste desposition through the discharge tube 40 with accuracy, without spattering and at a predetermined distance from the joint.

The alloy paste composition of the present invention is one that has good flow characteristics and yet which has adequate and sufficient stability and adherence to remain in place on the work surface until the fusing heat is applied, and that upon heating releases the molten metal in condition for forming a solid bond. In addition, the alloy paste composition is one that will leave, if any, a solid flux residue and is noncorrosive when utilized for soldering, for example, tin-plate materials. In the invention, it has been found that the soldering of various tin-plate products, such as tin cans or the like, can be extremely effectively achieved by the apparatus and process of the present invention by means of a solder paste comprising a mixture of powdered metal (tin-lead) and a flux, preferably a mildly activated rosin. The composition preferably includes 90 parts of solder metal and 10 parts by weight of flux. The viscosity of the solder paste (75°), as measured on the Brookfield Model HAFV Viscometer with helipath stand TD Spindle at 5 r.p.m., is preferably between 192,000 to 384,000 centipoises. The paste composition has a shelf life of at least six (6) months when stored in sealed containers at approximately 70F.

The tin-lead composition of the solder metal alloy is preferably of the ASTM B32 specification, as indicated in the following Table A:

TABLE A

| Solder Metal: [ASTM B32 Alloy Grade 40B] | % |
|---|---|
| Tin, Min | 39 |
| Antimony | 0.20–0.50 |
| Lead | Remainder |
| Bismuth, max | 0.25 |
| Copper, max | 0.08 |
| Iron, max | 0.02 |
| Arsenic, max | 0.02 |
| Zinc, max | 0.005 |
| Aluminum, max | 0.005 |

Preferably, the solder metal alloy has a solidus temperature of approximately 360° F. with a liquidus temperature of approximately 460° F. The solder paste has a solder metal content of between 87% and 92% and has a powered filler metal mesh size-passing U.S. Std. Sieve No. 60.

The flux is made from a mildly activated rosin. This a thermoplastic, acidic resin produced by hydrogenating wood rosin. The rosin has excellent heat stability and is resistant to oxidation. The residue from this flux material is solid and is essentially noncorrosive after the soldering process. The residue can be readily removed with organic solvents.

A preferred composition of the solder paste would have, by weight, 53 to 55 parts lead, 35 to 37 parts tin, 7 parts hydrogenated rosin, and until the balance thinner (terpineal). The composition has a viscosity between 150,000 and 500,000 centipoises with a melting temperature between 360° F. and 460° F. and with a shelf life of at least six (6) months. It will be understood, that other such paste compositions may be used in accordance with the process of the present invention so long as they have the ability to applicate and solder under the conditions of the present invention.

It is believed that the advantages and improved results of the automated dispensing system of the present invention will be apparent from the foregoing detailed description of a preferred embodiment thereof. It will be apparent that various changes and modification may be made to the illustrated preferred embodiment of the invention which has been without departing from the spirit and the scope of the invention as sought to be defined in the following claims.

We claim:

1. A process for joining a first metal component to a second metal component by means of a soft-solder alloy paste composition, the process comprising the steps of continuously moving said first metal component relative to a paste applicator station including an applicator gun means having an ejector nozzle, automatically controlling movement of said first metal component relative to said ejector nozzle, delivering a predetermined quantity of said alloy paste composition from said applicator gun means to and through said ejector nozzle, applying a predetermined pneumatic pulse into said nozzle in timed sequence with movement of said paste composition for shearing said paste composition to provide a predetermined discrete paste increment unit substantially simultaneously ejecting said increment unit axially from said ejector nozzle onto a predetermined area of said first metal component, said discrete unit of paste material is ejected from said applicator gun means by a distance at least as great as the maximum transverse dimension of the paste deposit resulting from disposition of the said paste unit increment, and said paste material has a viscosity, at ambient temperature, in the range between 150,000 and 500,000 cantipories, and wherein said pneumatic pressure is automatically controlled so as to deliver a pressure between 15 psi to 30 psi, moving said second metal component into engagement with said first metal component with said paste increment unit disposed in the joint area to provide a solder joint, heating said solder joint to physically join said components together, and cooling said joint to provide a metal-to-metal solder joint.

2. A process in accordance with claim 1, including ejecting said alloy paste composition at an acute angle from said ejector nozzle.

3. A nozzle device of the type for use with a pressure type fluent applicator, said nozzle device including body having a generally frusto-conical cavity formed therein, the apex end of said cavity communicating with an axial passageway adapted for receiving alloy paste material delivered from said cavity, an elongated discharge extension tube means extending from said nozzle device and in axial alignment with said passageway for receiving paste material delivered from said passageway, an angularly disposed pneumatic ejection tube means communicating with said axial passageway at about the junction of said cavity with said passageway and adapted at its free end to be connected to a source of pneumatic pressure for automatically discharging the paste material delivered from said cavity and through said passageway outwardly through said discharge extension tube means, and said pneumatic ejection tube means is disposed at an acute angle of less than 90° relative to the longitudinal center axis of said passageway.

* * * * *